United States Patent
Seifert (10) Patent No.: US 10,215,381 B2
(45) Date of Patent: Feb. 26, 2019

(54) SWITCHGEAR CABINET LUMINAIRE COMPRISING ILLUMINANTS ON THE BASIS OF LIGHT EMITTING DIODES AND CONNECTION ELEMENT FOR CONNECTING SAID SWITCH GEAR CABINET LUMINAIRES

(71) Applicant: SEIFERT MTM SYSTEMS (MALTA) LTD., Birzebbuga (MT)

(72) Inventor: Michael Seifert, Madliena (MT)

(73) Assignee: SEIFERT MTM SYSTEMS (MALTA) LTD., Birzebugga (MT)

(*) Notice: Subject to any disclaimer, the term of this patent is extended or adjusted under 35 U.S.C. 154(b) by 116 days.

(21) Appl. No.: 15/319,471

(22) PCT Filed: Jul. 20, 2015

(86) PCT No.: PCT/EP2015/066533
§ 371 (c)(1),
(2) Date: Dec. 16, 2016

(87) PCT Pub. No.: WO2016/016030
PCT Pub. Date: Feb. 4, 2016

(65) Prior Publication Data
US 2017/0198888 A1  Jul. 13, 2017

(30) Foreign Application Priority Data

Jul. 29, 2014  (DE) ........................ 10 2014 011 275
Dec. 8, 2014  (DE) ........................ 10 2014 018 083
Jan. 21, 2015  (DE) ........................ 10 2015 000 733

(51) Int. Cl.
*F21V 23/06* (2006.01)
*F21V 21/30* (2006.01)
(Continued)

(52) U.S. Cl.
CPC .............. *F21V 21/005* (2013.01); *F21S 4/28* (2016.01); *F21S 8/038* (2013.01); *F21S 9/02* (2013.01);
(Continued)

(58) Field of Classification Search
CPC ... H01R 13/6205; H01R 25/14–25/168; H01R 25/162; F21V 17/002;
(Continued)

(56) References Cited

U.S. PATENT DOCUMENTS 5,653,412 A * 8/1997 Martorano ............ F21V 21/025
248/222.11
2006/0009071 A1 * 1/2006 Laukhuf ................ H01R 31/06
439/502

(Continued)

FOREIGN PATENT DOCUMENTS

DE  200 16 067  2/2002  ................ F21L 4/08
DE  201 09 396  10/2002  .............. F21V 23/04
(Continued)

OTHER PUBLICATIONS

Machine translation of DE 10 2012 206068 A1, retrieved Jul. 10, 2018.*
(Continued)

*Primary Examiner* — Bao Q Truong
*Assistant Examiner* — Steven Y Horikoshi
(74) *Attorney, Agent, or Firm* — Bodner & O'Rourke, LLP; Gerald T. Bodner; Christian P. Bodner (57) ABSTRACT

A switchgear cabinet luminaire comprising illuminants on the basis of light emitting diodes, consisting of an elongated luminaire housing comprising housing main body and light-transmissive cover and electrical connection elements and means for fixing that are provided on the luminaire housing. The luminaire body is embodied in a trough-like fashion and
(Continued)

a plurality of spaced-apart cutouts or recesses for releasably receiving a pivoting bearing carrier are provided on the underside of said luminaire body and/or in the side wall region. The pivoting bearing carrier has two side surfaces connected via a web, each side surface having a receptacle for a pivoting spindle. Arms are formed in a manner proceeding from the web and are oriented toward the underside or toward the side wall region of the housing main body and, at the free end of said arms, undergoing transition to a latching lug or to a latching hook.

3 Claims, 10 Drawing Sheets

(51) Int. Cl.

| | | |
|---|---|---|
| F21V 21/005 | (2006.01) | |
| F21V 21/088 | (2006.01) | |
| F21S 8/00 | (2006.01) | |
| F21V 21/02 | (2006.01) | |
| F21V 21/096 | (2006.01) | |
| F21S 4/28 | (2016.01) | |
| H02B 1/30 | (2006.01) | |
| H05K 5/02 | (2006.01) | |
| F21S 9/02 | (2006.01) | |
| F21V 3/02 | (2006.01) | |
| F21V 17/02 | (2006.01) | |
| F21V 23/04 | (2006.01) | |
| F21W 131/30 | (2006.01) | |
| H02B 1/052 | (2006.01) | |
| F21Y 103/10 | (2016.01) | |
| F21Y 115/10 | (2016.01) | |
| F21Y 101/00 | (2016.01) | |

(52) U.S. Cl.
CPC ............... *F21V 3/02* (2013.01); *F21V 17/02* (2013.01); *F21V 21/025* (2013.01); *F21V 21/088* (2013.01); *F21V 21/096* (2013.01); *F21V 21/30* (2013.01); *F21V 23/06* (2013.01); *H02B 1/30* (2013.01); *H02B 1/306* (2013.01); *H05K 5/02* (2013.01); F21V 23/0471 (2013.01); F21W 2131/30 (2013.01); F21Y 2101/00 (2013.01); F21Y 2103/10 (2016.08); F21Y 2115/10 (2016.08); H02B 1/052 (2013.01)

(58) Field of Classification Search
CPC .... F21V 15/013; F21V 15/015; F21V 21/005; F21V 21/025; F21V 21/088; F21V 21/0885; F21V 21/30; F21V 23/06; F21S 8/033; F21S 8/036; F21S 8/037; F21S 8/038; F21S 8/043; F21S 8/046; F21S 2/005; F21S 4/28; F21K 9/27; F21K 9/272
See application file for complete search history.

(56) References Cited

U.S. PATENT DOCUMENTS

| | | | | |
|---|---|---|---|---|
| 2007/0035965 A1* | 2/2007 | Holst | ......... | F21V 3/04 362/608 |
| 2010/0103687 A1* | 4/2010 | Pitlor | ......... | F21S 8/038 362/398 |
| 2011/0075413 A1* | 3/2011 | Smith | ......... | F21S 2/00 362/235 |
| 2011/0211330 A1* | 9/2011 | Wang | ......... | F21V 29/74 362/20 |
| 2012/0250309 A1* | 10/2012 | Handsaker | ......... | F21V 5/04 362/235 |
| 2013/0120974 A1 | 5/2013 | Swisha et al. | ......... | 362/147 |

FOREIGN PATENT DOCUMENTS

| | | | | |
|---|---|---|---|---|
| DE | 10 2009 004 062 | | 7/2010 | ............. F21L 14/00 |
| DE | 20 2011 107 688 | | 1/2012 | ............. F21V 14/02 |
| DE | 20 2012 104 978 | | 1/2013 | ............. F21V 3/00 |
| DE | 10 2012 202 148 | | 8/2013 | ............. F21S 4/00 |
| DE | 102012206068 A1 * | | 10/2013 | ............. F21V 23/06 |
| EP | 1 670 107 A1 | | 6/2006 | ............. F21V 21/08 |
| EP | 1 670 107 B1 | | 1/2008 | ............. F21V 21/08 |
| EP | 2 375 128 | | 10/2011 | ............. F21S 4/00 |
| EP | 2 400 210 | | 12/2011 | ............. F21S 4/00 |
| EP | 2 442 010 | | 4/2012 | ............. F21S 10/02 |
| EP | 2 650 594 | | 10/2013 | ............. F21S 4/00 |
| EP | 2 827 052 | | 1/2015 | ............. F21S 4/00 |

OTHER PUBLICATIONS

Notification Concerning Transmittal of International Preliminary Report on Patentability (Chapter I of the Patent Cooperation Treaty), in English, dated Feb. 9, 2017, which was issued by the International Bureau of WIPO in Applicant's corresponding international PCT application having Serial No. PCT/EP2015/066533, filed on Jul. 20, 2015.
English translation of the International Preliminary Report on Patentability (Chapter I of the Patent Cooperation Treaty), dated Jan. 31, 2017, which was issued by the International Bureau of WIPO in Applicant's corresponding international PCT application having Serial No. PCT/EP2015/066533, filed on Jul. 20, 2015.
Written Opinion of the International Searching Authority, in English (Jan. 31, 2017—dated with the English translation of the International Preliminary Report on Patentability), which was issued by the International Bureau of WIPO in Applicant's corresponding international PCT application having Serial No. PCT/EP2015/066533, filed on Jul. 20, 2015.
International Search Report, in English, dated Sep. 4, 2015, which was issued by the International Bureau of WIPO in Applicant's corresponding international PCT application having Serial No. PCT/EP2015/066533, filed on Jul. 20, 2015.

* cited by examiner

SWITCHGEAR CABINET LUMINAIRE COMPRISING ILLUMINANTS ON THE BASIS OF LIGHT EMITTING DIODES AND CONNECTION ELEMENT FOR CONNECTING SAID SWITCH GEAR CABINET LUMINAIRES

The invention relates to a switchgear cabinet luminaire, comprising illuminants on the basis of light-emitting diodes, consisting of an elongated luminaire housing having a housing main body and a translucent cover as well as electrical connection elements and means for universal fixing provided on the luminaire housing according to the preamble of claim 1.

Switchgear cabinet luminaires on the basis of light-emitting diodes belong to the prior art. Luminaires operated on the basis of LEDs are energy-saving, light, sturdy and durable in comparison with fluorescent tubes. Switchgear cabinet luminaires are provided with respective switching means and can be equipped with a power socket. Variants are further known with motion detectors or door limit switches. Several LED luminaires can be connected to each other via pluggable connecting cables.

Reference is hereby made for example to DE 10 2009 004 062 A1 concerning the illumination of switchgear cabinets with light sources on the basis of LEDs. The portable light source which is described there can principally be operated by batteries or rechargeable batteries. A power supply can also be present in the respective switchgear cabinet, to which the light source is connected. In order to arrange the light source at different points within the cabinet, a permanent magnet is present in order to allow the fixing of the luminaire to metallic components of switchgear cabinet.

In the switchgear luminaire according to DE 201 09 396 U1, a luminaire housing is provided with fastening apparatuses for producing a connection to the switchgear cabinet in addition to the luminaire and a plug connection to the luminaire. The luminaire housing in this case at least comprises the luminaire in the middle region and the fastening and/or operating elements in two outer regions.

A switchgear cabinet luminaire for network-independent operation is described in DE 200 16 067 U1. An energy storage unit, e.g. in form of a rechargeable battery, which is explained in said specification is inserted into a removable and freely movable luminaire body in order to ensure the desired network-independent operation. A charging unit with charge status control is further disposed in the holding base for the luminaire.

In the case of the generic switchgear cabinet luminaire with luminaires on the basis of light-emitting diodes according to EP 1 670 107 B1, the luminaire housing can be inserted for example via hook-shaped latching means into a mounting perforation of a profile section in the luminaire housing. Alternatively, the lateral surfaces of the housing of the luminaire can comprise fastening perforations for leading through screws, by means of which the luminaire can be fixed to the aforementioned profile strip. It is similarly possible that the housing is fixed by means of magnets to at least one profile section.

In order to ensure an especially constant illumination of a switchgear cabinet, it has been proposed according to EP 1 670 107 B1 to arrange several luminaires within a switchgear cabinet and to switch them in series. Reference is hereby made to respective plug connections in order to electrically connect the luminaires. In one embodiment, an integrated motion detector and/or a socket can be arranged on the luminaire body.

It is therefore the object of the invention, on the basis of the statements made above, to provide a further developed switchgear cabinet luminaire with luminaires based on light-emitting diodes, consisting of an elongated luminaire housing with a housing main body and a translucent cover as well as electrical connection elements, which depending on the respective purpose can be fastened securely at different positions of a switchgear cabinet or the like, and wherein the possibility is maintained to produce optimal orientation of the beam of the luminaire by means of pivoting, so that maintenance and installation work can be carried out with the respective security even under adverse conditions. The system is based on a quasi-universal luminaire housing, which is provided with means to connect different fastening elements by maintaining the pivotability with the luminaire housing. If necessary, the luminaire should be removable without any tools from the respective fastening in order to also use the luminaire as a portable luminaire on site. Furthermore, the stringing together of several luminaires in addition to looped electrical connections shall be possible, wherein the required electrical safety is provided.

This object of the invention is achieved by a switchgear cabinet luminaire with luminaires on the basis of light-emitting diodes according to the combination of features according to claim 1, wherein the dependent claims at least represent appropriate embodiments and further developments.

Notice must be taken at this point that the conception of the switchgear cabinet luminaire shall be understood in such a way that the luminaire in accordance with the invention can obviously not only be used in electrical switchgear cabinets but principally wherever there is a diverse number of possibilities for fixing an elongated luminaire body. This can be the case for example in basement rooms of in-house installations, workshop pits for motor vehicles, cabinets for storing materials etc.

The switchgear cabinet luminaire in accordance with the invention is formed as a so-called varying-voltage luminaire, i.e. the luminaire can be operated with a supply voltage of 24 V DC up to 260 V AC. Any adjustments such as the switchover to a different voltage range are not necessary.

The switchgear cabinet luminaire in accordance with the invention is based on a trough-shaped housing main body. All necessary electrical elements concerning the power supply for the inserted light-emitting diodes, including a support which accommodates the diodes or groups of diodes, are disposed in the housing main body.

Several spaced recesses or set-back portions for the releasable accommodation of a special pivot bearing support are provided on the bottom side of the housing main body and/or in the side wall region of the housing main body.

Said recesses or set-back portions are preferably present in pairs and spaced over the longitudinal extension of the housing main body in order to enable fixing of several of the pivot bearing supports.

The pivot bearing support or supports comprise two side surfaces which are connected via at least one web, wherein the side surfaces each comprise a receptacle for a pivot shaft or a respective pivot shaft stub.

Arms are further formed which originate from the at least one web, which arms are oriented towards the bottom side or the side wall region of the housing main body.

At their free end, the arms each converge into a detent lug or a latching hook for engagement in the respective recesses or set-back portions on the housing main body.

The arms can be formed in a U-shaped manner in the longitudinal section and comprise an actuating surface by means of which a force can be applied for the purpose of release from the recesses or set-back portions in the housing main body, such that the detent lugs or latching hooks emerge from the respective recesses or set-back portions by effectively compressing the arms via the actuating surfaces and are thus released.

Furthermore, the side surfaces of the pivot bearing support comprise a compliant, resilient stop edge which can be brought into contact with the bottom side of the housing main body, wherein, in the region facing away from the stop edge, several latches for locking the pivot angle are provided in the side surfaces, which latches originate radially from the receptacle for the pivot shaft or the pivot shaft stub.

As a result of the resiliently and compliantly formed stop edges of the respective side surfaces, a pretension is built up in conjunction with the detent lugs or latching hooks after the fixing in the respective recesses or set-back portions in the housing main body, which pretension is used for securing the position and improved fixing of the pivot bearing support on the housing main body. In order to form the desired compliantly resilient stop edge, the respective side surface can have overbending in the direction of the housing main body relating to the mounting state, namely within the terms of a resilient section in conjunction with a resulting large-area set-back portion.

The aforementioned latches for locking the pivot angle can be formed as boreholes extending on a circular arc section or only be realised in form of set-back portions.

Notice must be taken at this point that the latching recess and latching hook or the formation of latches shall always be understood in such a way that a respective kinematic reversal can be considered relating to the arrangement and interaction of the recess and the hook, as well as the lug and the set-back portion, without departing from the inventive concept.

A base part can be inserted into the aforementioned pivot bearing support, which base part comprises two side walls with a base, wherein the pivot shaft or the respective pivot shaft stub and furthermore the means complementary to the latches are formed on the side walls.

The base with the side walls extending from the base can preferably be produced in an integral or single-part manner by means of an injection moulding process for example, which apart from that also applies to the pivot bearing support. The means complementary to the latches can each comprise a detent lug for example, which engage in the respective set-back portions or boreholes depending on the position of the rotational angle and which thus fix the selected rotational angle. The distance and the measure of the boreholes or set-back portions in the side walls of the pivot bearing support determine the amount of the resolution of the rotational angle.

The base of the base part can now comprise means for top-hat rail mounting, means for fixing to profiles provided with latching recesses, but also means for bolted fastening or a combination of these means.

Respectively opposite set-back portions for accommodating the latching hooks or detent lugs as well as grooves or rail-like recesses disposed at a right angle to the longitudinal axis of the luminaire housing are provided on the bottom side of the housing main body of the switchgear cabinet luminaire, wherein the stop edges of the pivot bearing support dip into the respective grooves or rail-like recesses. In this respect too, secure fixing of the position and adequate holding of the pivot bearing support on the switchgear cabinet luminaire and therefore a respectively secure fastening are ensured.

The described luminaire housing is formed so that it can be stringed together and thus comprises electrical connectors on the face ends for virtually looping through the power supply for the luminaire.

A possibility is further provided on the housing for attaching a switching means and/or a motion sensor triggering an electrical function.

There is an alternative or principal possibility to provide a permanent magnet on the housing main body, especially a permanent magnet strip or several such strips, in order to temporarily fix said luminaire in a rapid and secure manner to metallic components of the respective switchgear cabinet in the event that the luminaire is used as a portable luminaire, this being before said luminaire is connected again in a latching manner to the pivot bearing support or the base part.

In a further development of the teachings of the invention, means are provided in the luminaire housing for the network-free operation of the luminaires, especially batteries or rechargeable batteries.

A socket module and/or a battery and/or rechargeable battery module which is adjusted with respect to its contour can be coupled via the aforementioned connectors at the face end. It is also possible to supplement or retrofit an already existing switchgear cabinet luminaire with these functionalities.

According to the initially explained object, the stringing together of several luminaires in addition to daisy-chained electrical connections shall be possible, wherein the required electrical contact safety is ensured when the luminaires are strung together.

In this case, a connection element for coupling switchgear cabinet luminaires is assumed. The connection element preferably consists of an insulating plastic material and comprises electrical connectors in its interior which are formed as a pin for example.

The means for coupling the switchgear cabinet luminaires consists of a hollow body which is open on both sides, wherein the opposite open sides of the hollow body have a cross-sectional surface at least in sections which is complementary to the cross-sectional shape of the luminaire housing, such that the respective ends of the luminaire housing can be inserted into the open sides of the hollow body and can be locked there. Conventional detent lugs can correspond with latching recesses concerning the locking, wherein detent lugs are provided on the upper side of the luminaire housing for example and respective latching recesses are disposed in the hollow body. Kinematic reversal is obviously also possible in this case.

The detent lugs are preferably provided with the property that they can be moved from their relaxed latching position by pressure to such a position that a separation between the respective luminaire and the connector or the hollow body is possible. A respective formation of detent lug and latching recess is at the discretion of the respective person skilled in the art.

The electrical connectors situated in the interior of the hollow body correspond to the intended power supply of the luminaires concerning their properties and their numbers, and to the principles of electrical safety concerning separation distance, dielectric strength and current carrying capacity. In this respect, proven classical electrical connectors can be used which are formed as male-female plug-in parts or sockets.

A pivotably movable pawl with a stop and a blocking web is disposed in the interior of the hollow body as a connection element for coupling the switchgear cabinet luminaires.

The blocking web prevents insertion of a live switchgear cabinet luminaire for such a time until a further, voltage-free switchgear cabinet luminaire to be coupled has been inserted into the opposite open side of the hollow body. It is thus prevented by this measure that the current-carrying connectors disposed in the interior can be touched via the open side of the hollow body when a current-carrying luminaire is potentially inserted otherwise.

Following the completed insertion of the voltage-free switchgear cabinet luminaire, the respective luminaire housing, and especially the face end of the luminaire housing, comes into contact with the stop of the pawl, with the consequence of a movement of the blocking web from its blocking position to a release position.

The invention will be explained below in closer detail by reference to embodiments and the drawings, wherein.

The same reference numerals are used for the same means and elements in the embodiments as explained below.

Figure 1:
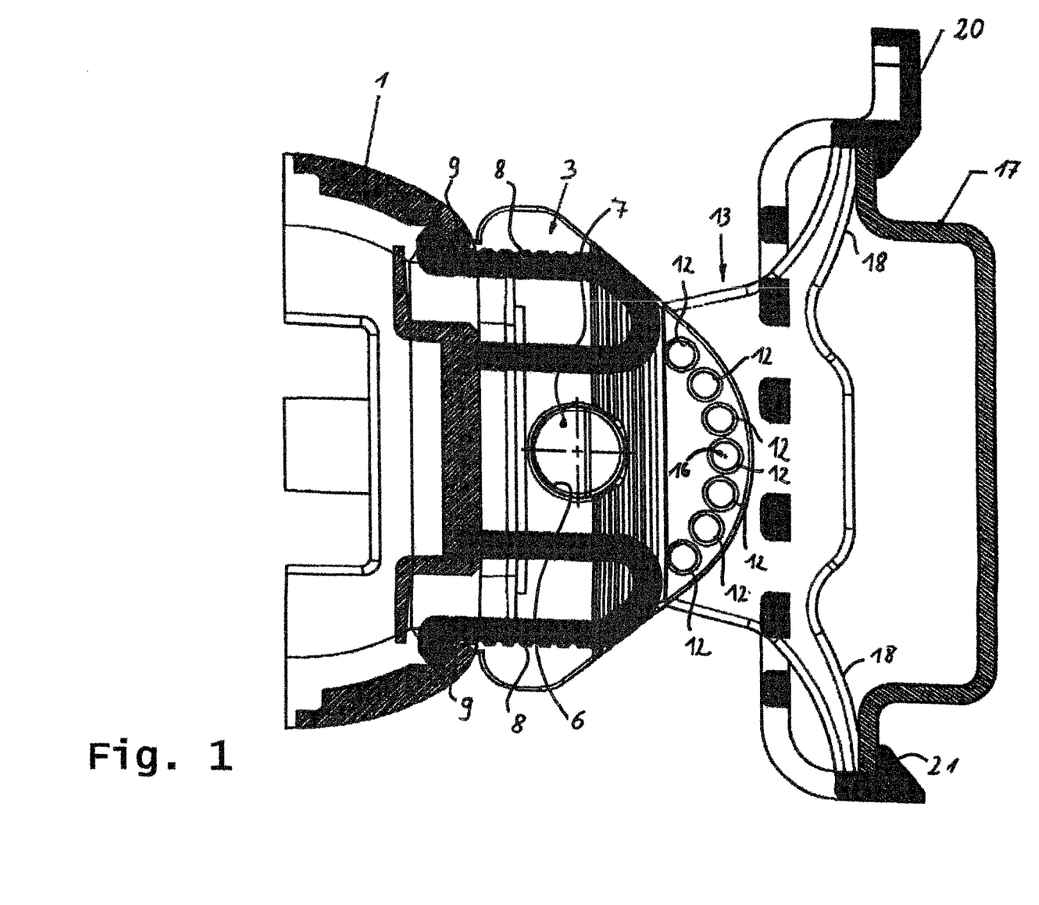
FIG. 1 shows a cross-sectional view of an arrangement consisting of the housing main body of the switchgear cabinet luminaire with the pivot bearing support and the base part for top-hat rail mounting which is inserted into the pivot bearing support.

As is shown in FIG. 1 and the sectional view there, a housing main body 1 is present which has a trough-shaped form.

Recesses or set-back portions 2 (also see FIG. 5) are present on the bottom side of the housing main body 1, which are used for the releasable accommodation of a pivot bearing support 3.

Figure 4:
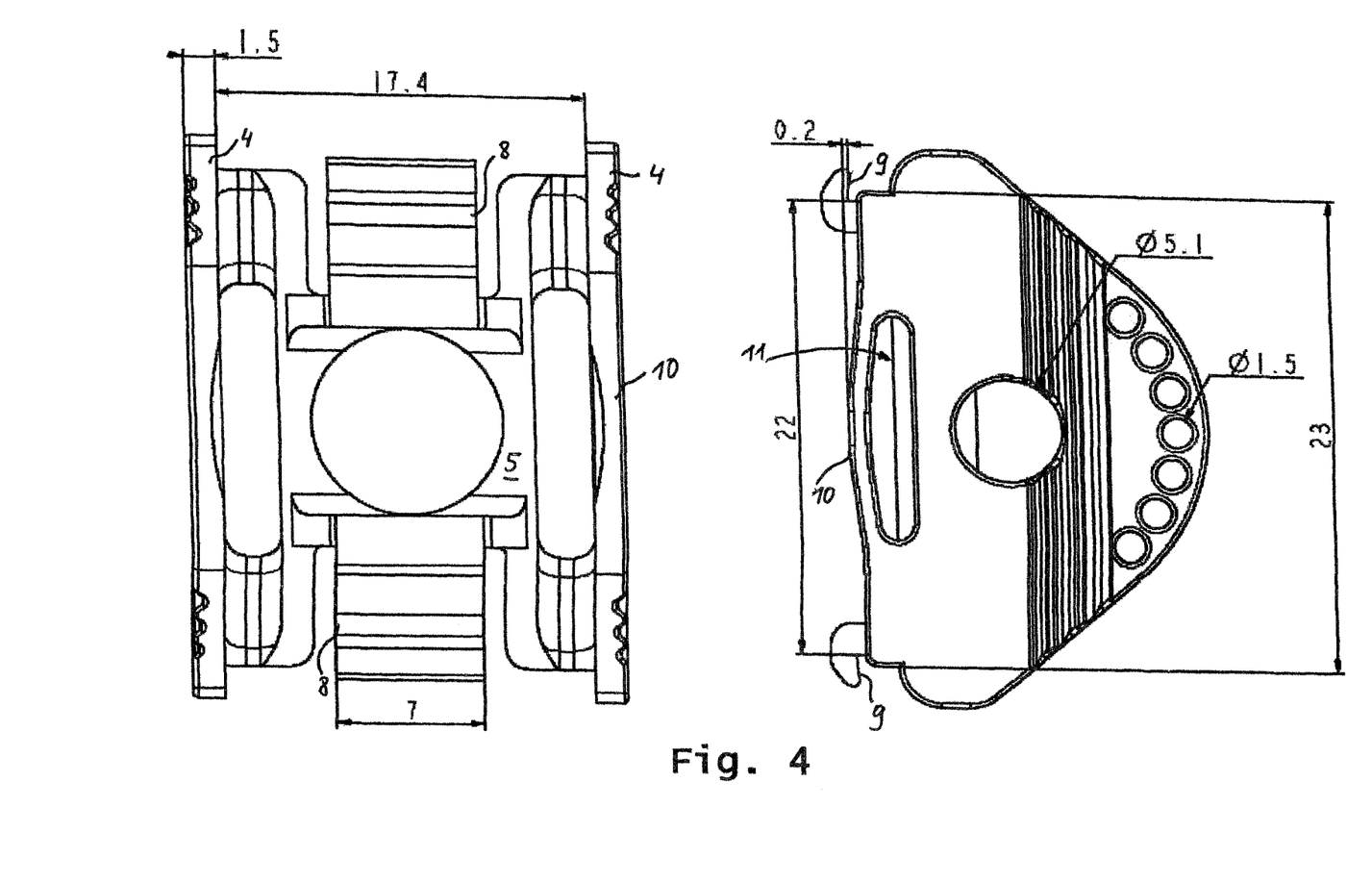
FIG. 4 shows a top view and side view of a pivot bearing support without the base part.

The pivot bearing support 3 comprises two mutually spaced side surfaces 4 (also see FIG. 4). The side surfaces 4 are in connection via a web 5.

A receptacle 6 for a pivot shaft 7 (see FIG. 3) is formed in the side surfaces 4.

Two arms 8 extend from the web 5 to the bottom side of the housing main body 1.

At the respective free end, the arms 8 each converge into a latching hook 9 for engagement in the respective recesses or set-back portions 2 in the housing main body 1.

The side surfaces 4 of the pivot bearing support 3 each comprise a yieldingly resilient stop edge 10.

Said yieldingly resilient stop edge 10 is realised by an overbent formation of the web, wherein the resilience is caused on the one hand by the material and on the other hand by the free surface 11 disposed behind the web.

Several latches 12, which are provided in the shape of an arc, for locking the selected pivot angle are disposed on the side which faces away from the stop edge 10 opposite the respectively averted region in the respective side surfaces, originating radially from the receptacle 6 for the pivot shaft 7.

The pivot bearing support 3 can be combined with various base parts, as shown in the drawings. In this respect, the base part 13 comprises two side walls 14 (see FIG. 3) and consists of a base 15.

The side walls 14 extend upwardly from the base 15, thus leading to a substantially U-shaped form.

A pivot shaft 7 or a respective shaft stub is formed on the side walls 14. Furthermore, means 16, which are provided in form of a latching elevation for example if the latches 12 are formed as latching set-back portions or latching boreholes and which are complementary to the latches 12, are further situated on the side walls.

Figure 2:
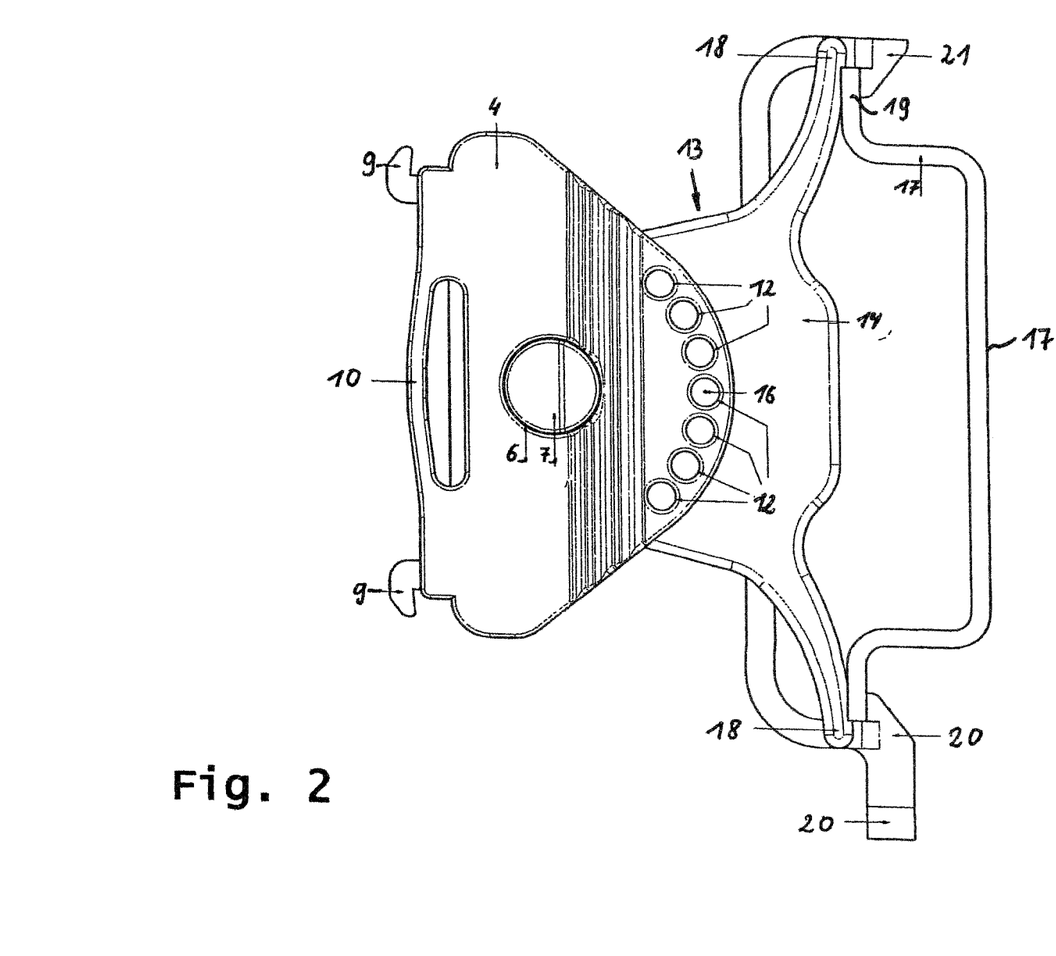
FIG. 2 shows a side view of the pivot bearing support with the base part for top-hat rail mounting similar to that according to FIG. 1, but without the housing main body.
Figure 3:
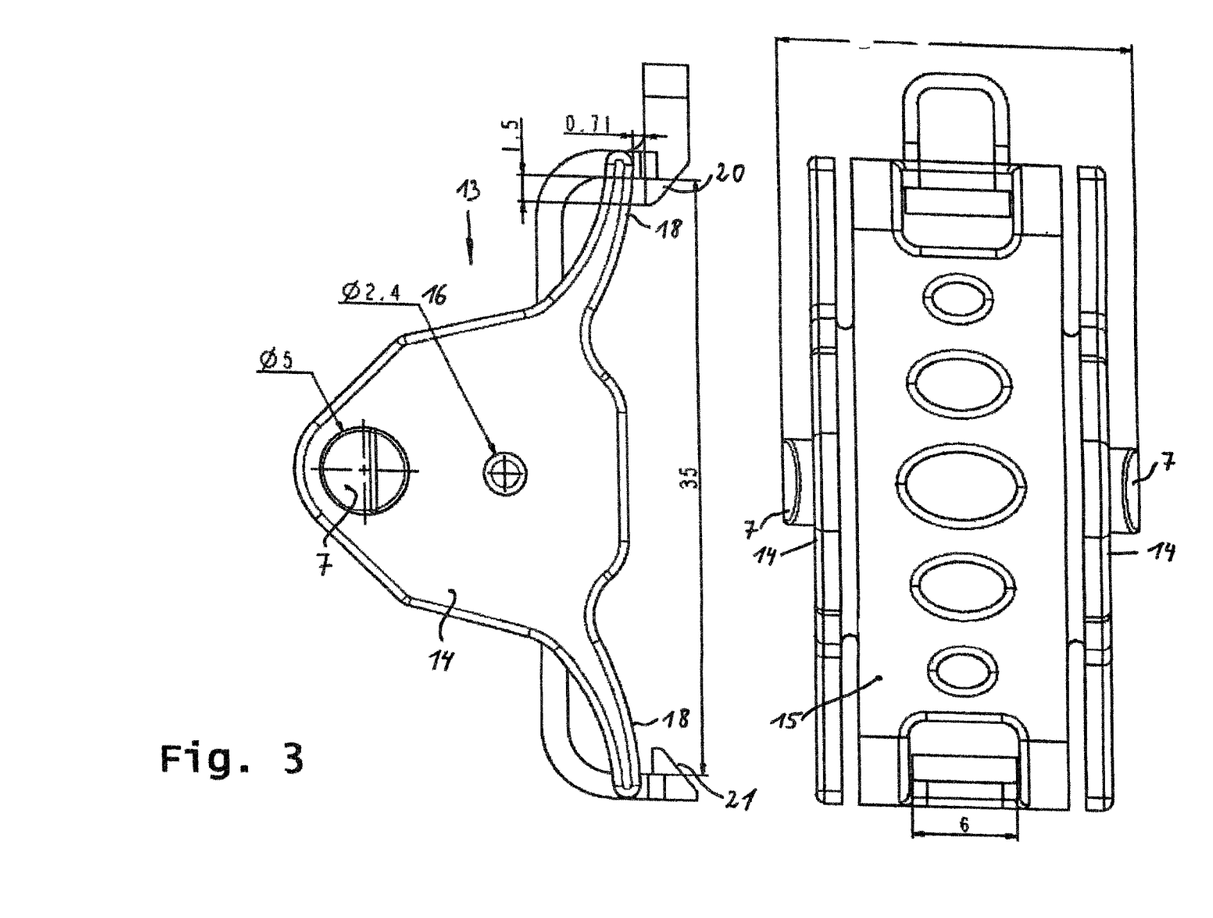
FIG. 3 shows a side view and a top view of a base part, formed for DIN top-hat rail mounting.
Figure 7:
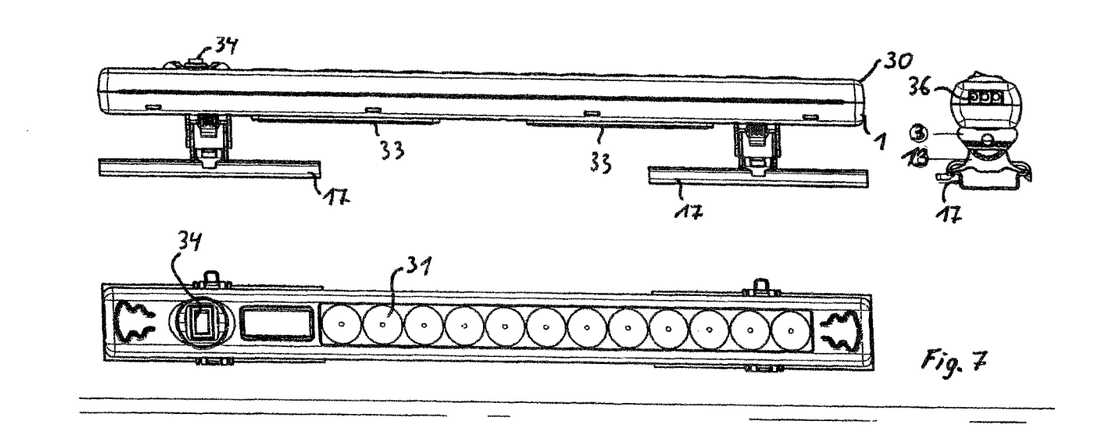
FIG. 7 shows a longitudinal side view, front view and top view of a switchgear cabinet luminaire with pivot bearing support and base part, mounted on a top-hat rail.

The base 15 can comprise means for top-hat rail mounting (see FIGS. 2 and 3 in conjunction with FIG. 7). These means allow a clamping engagement behind a respective top-hat rail 17. Reference is also made here to the stop ends 18, which come into contact with the offset ends 19 of the top-hat rail 17, and a further detent lug 20 and 21.

Spreader surfaces with a set-back portion 22 (see FIG. 8) can also be provided on or integrally attached to the base 15 for fixing profiles provided with latching recesses.

Figure 9:
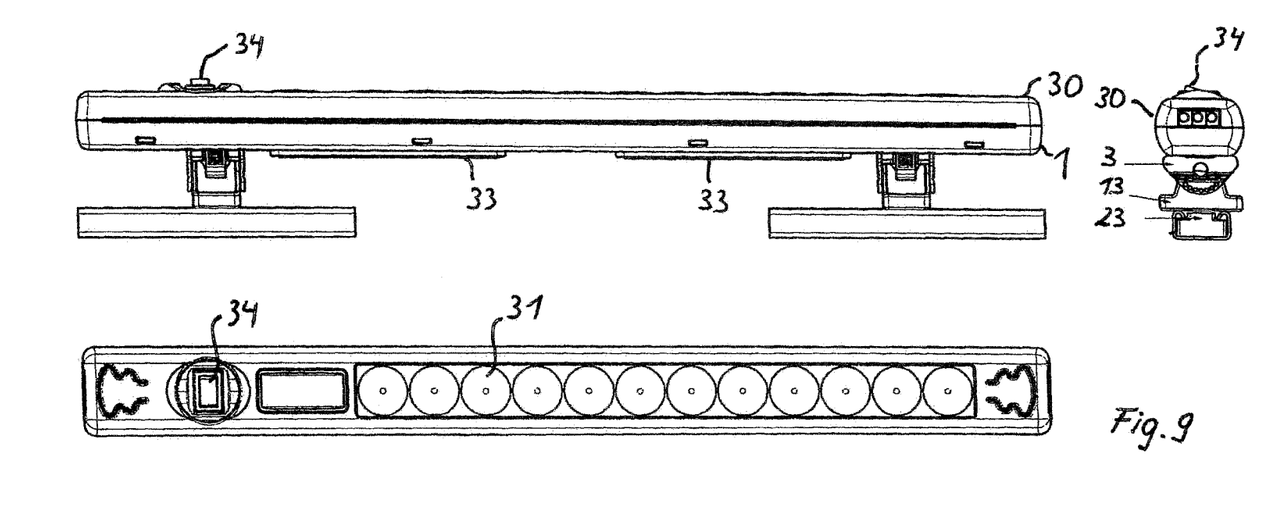
FIG. 9 shows a longitudinal side view, side view and top view of a switchgear cabinet luminaire with pivot bearing support and base part, wherein the base part is formed for bolted mounting.

Similarly, the base can be formed as a screw base 23 (see FIG. 9).

In one embodiment of the invention, the bottom side of the housing main body 1 comprises respectively opposite set-back portions 200 for accommodating the latching hooks 9 and furthermore grooves 210 which are oriented at a right angle to the longitudinal axis of the luminaire housing, wherein the stop edges 10 of the pivot bearing support 3 dip into the respective grooves 210.

Figure 5:
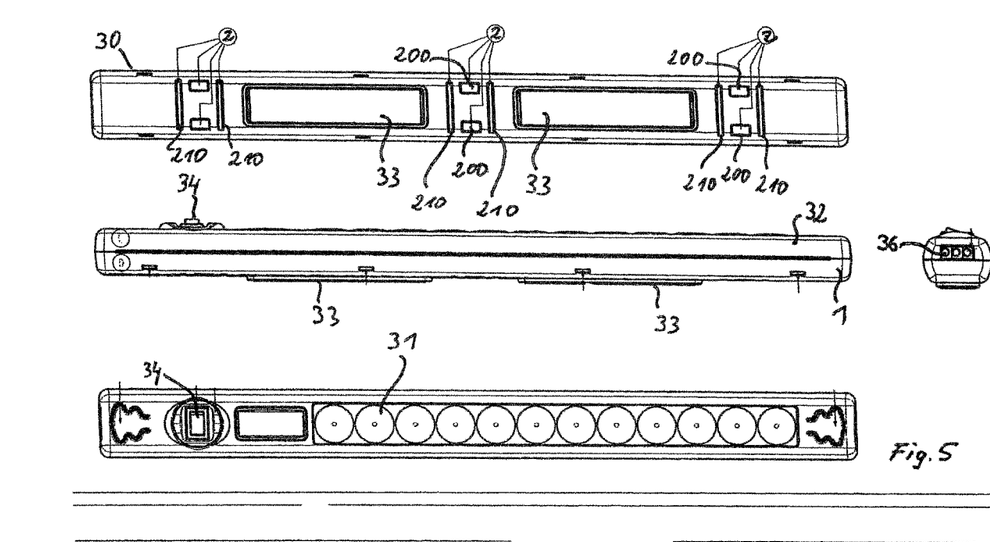
FIG. 5 shows a bottom view of a switchgear cabinet luminaire in the embodiment with switch, a side view of such a switchgear cabinet luminaire, a front and top view of such a luminaire.

The illustrations according to FIG. 5 show the elongated formation of the switchgear cabinet luminaire 30 with a plurality of light-emitting diodes 31 disposed in the housing.

The housing consists of the aforementioned housing main body 1 and a translucent cover 32.

Strip-like permanent magnets 33 can further be provided on the bottom side of the housing.

Electrical switching means 34 are present on the upper side of the luminaire housing in the illustration according to FIG. 5.

Figure 6:
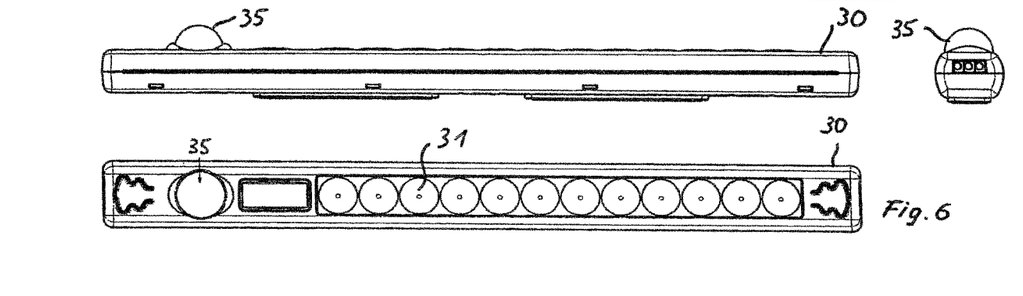
FIG. 6 shows a longitudinal and side view as well as a top view of a switchgear cabinet luminaire with integrated motion sensor.

The illustration according to FIG. 6 alternatively shows the use of a motion sensor 35 for the automatic activation of the luminaire 30.

The luminaire housings can be daisy-chained and are electrically connectable via front connectors 36.

The views according to FIG. 7 shows an embodiment for fastening the switchgear cabinet luminaire 30 to a top-hat rail 17, as already explained above.

Figure 8:
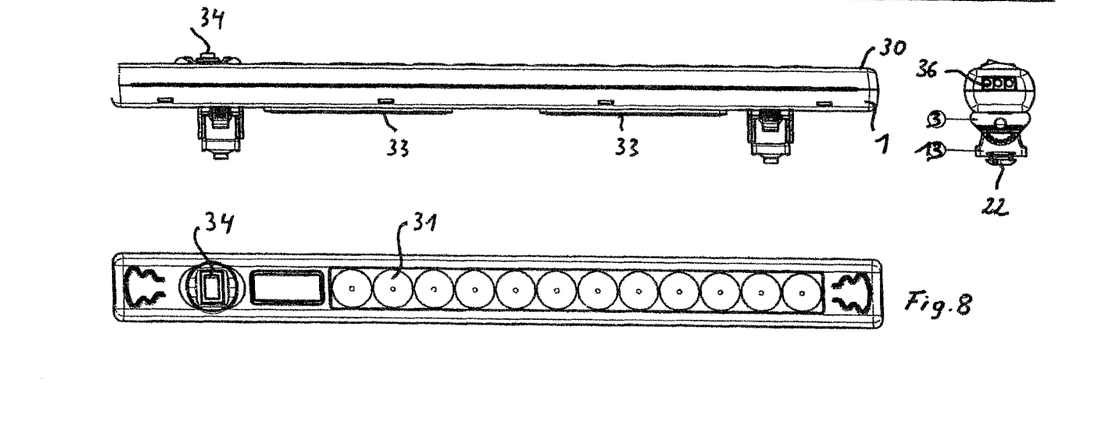
FIG. 8 shows a longitudinal side view, front view and top view of a switchgear cabinet luminaire with pivot bearing support and base part, wherein the base part is formed for insertion into the profiles provided with the latching recesses.

The illustrations according to FIG. 8 show a fastening possibility via a base which is capable of being latched into recesses of profile strips.

FIG. 9 relates to a fastening of the switchgear cabinet luminaire 30 via a screw base 23.

Figure 10:
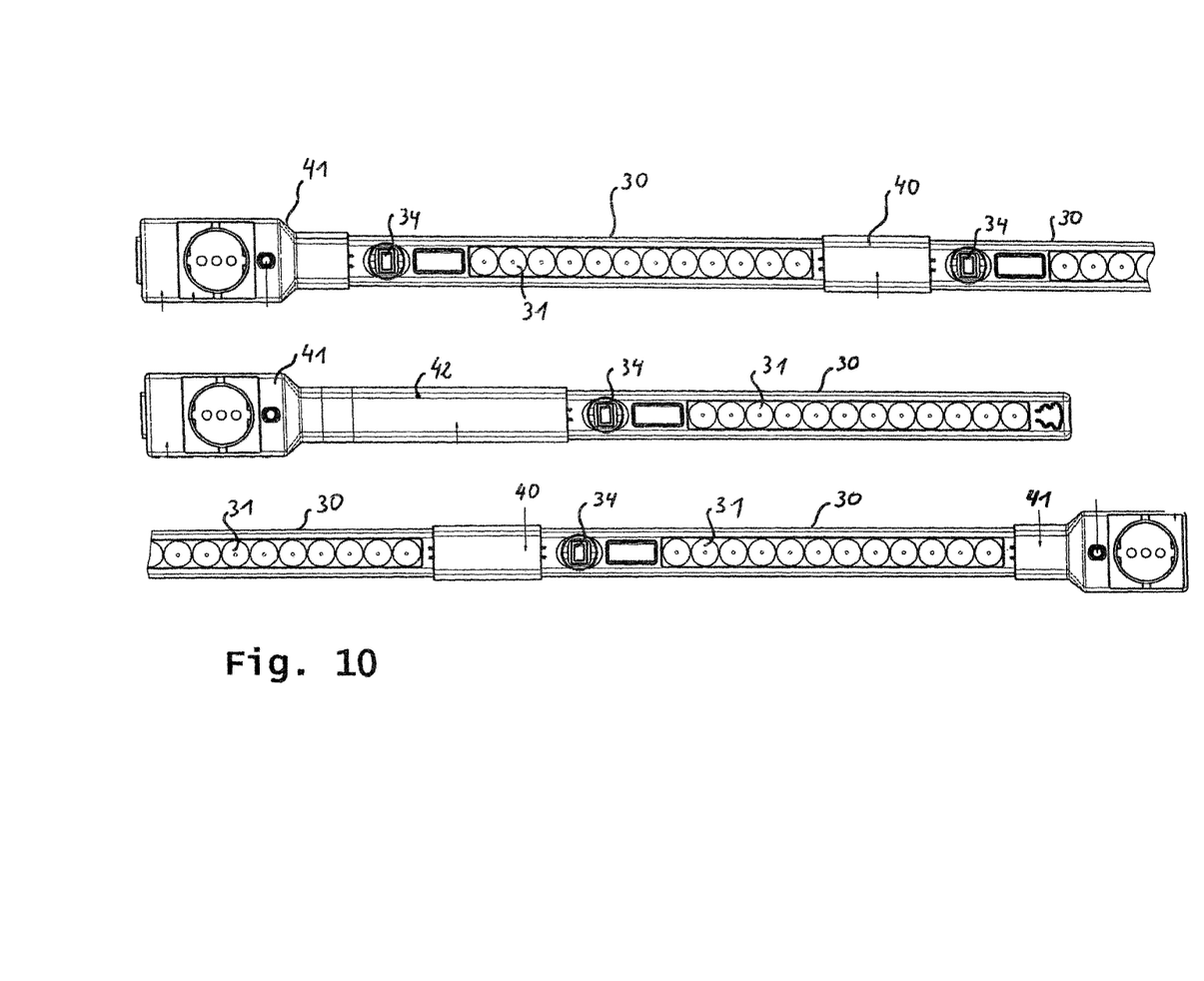
FIG. 10 (from top to bottom) shows a top view of a switchgear cabinet luminaire, consisting of two coupled luminaires with a rigid coupling element and a coupled outlet socket module, a switchgear cabinet luminaire with a battery module coupled on the front side and an outlet socket module coupled thereto, as well as two daisy-chained switchgear cabinet luminaires with end closure module, formed as an outlet socket.

The illustrations according to FIG. 10 relate to different possibilities for daisy-chaining several switchgear cabinet luminaires 30 via a rigid connection element 40. An outlet socket module 41 is further provided and there is the possibility to form a daisy-chaining of outlet socket module 41, battery module 42 and the actual switchgear cabinet luminaire 30.

A special outlet socket module 41 can also be coupled for end-side termination. The cross-section of the switchgear cabinet luminaire is preferably formed in such a way that the luminaire can also be fixed with known, arc-shaped holding clamps, so that the universal usefulness and usability is further improved.

It will be explained by reference to FIGS. 11a to 11d how several switchgear cabinet luminaires can be coupled via a connection element.

Figure 11:
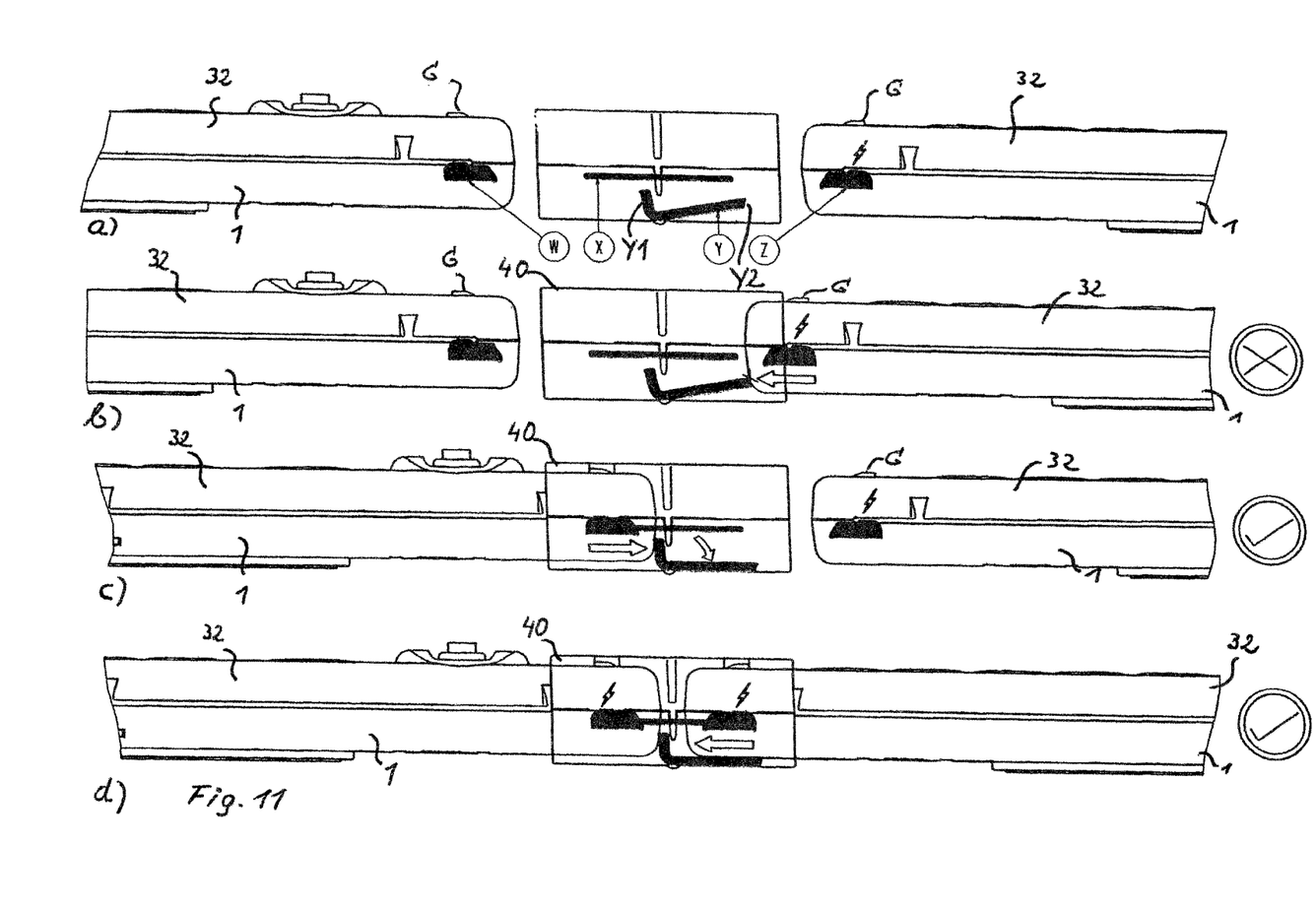
FIGS. 11*a* to 11*d* show an illustration of the coupling of switchgear cabinet luminaires with ensured electrical safety by the formation in accordance with the invention of a pawl in the connector hollow body.

As is shown in FIG. 11a, it is intended to connect two switchgear cabinet luminaires to the housing main body 1 and the translucent cover 32 as well as the electrical connection elements W and Z, and a hollow body 40 which is open on both sides is inserted as a connection element and the oppositely open sides of the hollow body have a cross-sectional area which is substantially complementary to the cross-sectional shape of the luminaire housing, such that the respective ends of the luminaire housing can be inserted into the hollow body 40 and locked there.

Electrical connectors in form of pins X are arranged in or inserted into the interior of the hollow body 40.

The switchgear cabinet luminaire is live (symbolised by the lightning sign) on the right side in the image in the example according to FIGS. 11a to 11d.

As long as the left switch gear cabinet luminaire shown in FIGS. 11a to 11d has not yet been inserted into the respective open side of the hollow body 40, the pawl Y is in the blocking position with its blocking web Y2.

This is shown in FIG. 11b.

Only when the left switchgear cabinet luminaire was inserted into the open side of the hollow body 40, the face end of the respective luminaire housing comes into contact with the stop Y1 of the pawl Y. As a result, the blocking web Y2 moves downwardly according to the illustration in FIG. 11c, i.e. a movement of the blocking web Y2 occurs to its release position. According to the next following illustration 11d, the respective end of the luminaire housing of the switchgear cabinet luminaire shown on the right-hand side in the image can be pushed into the hollow body 40. The electrical connection between the two switchgear cabinet luminaires is now produced via the pins X.

Figure 12:
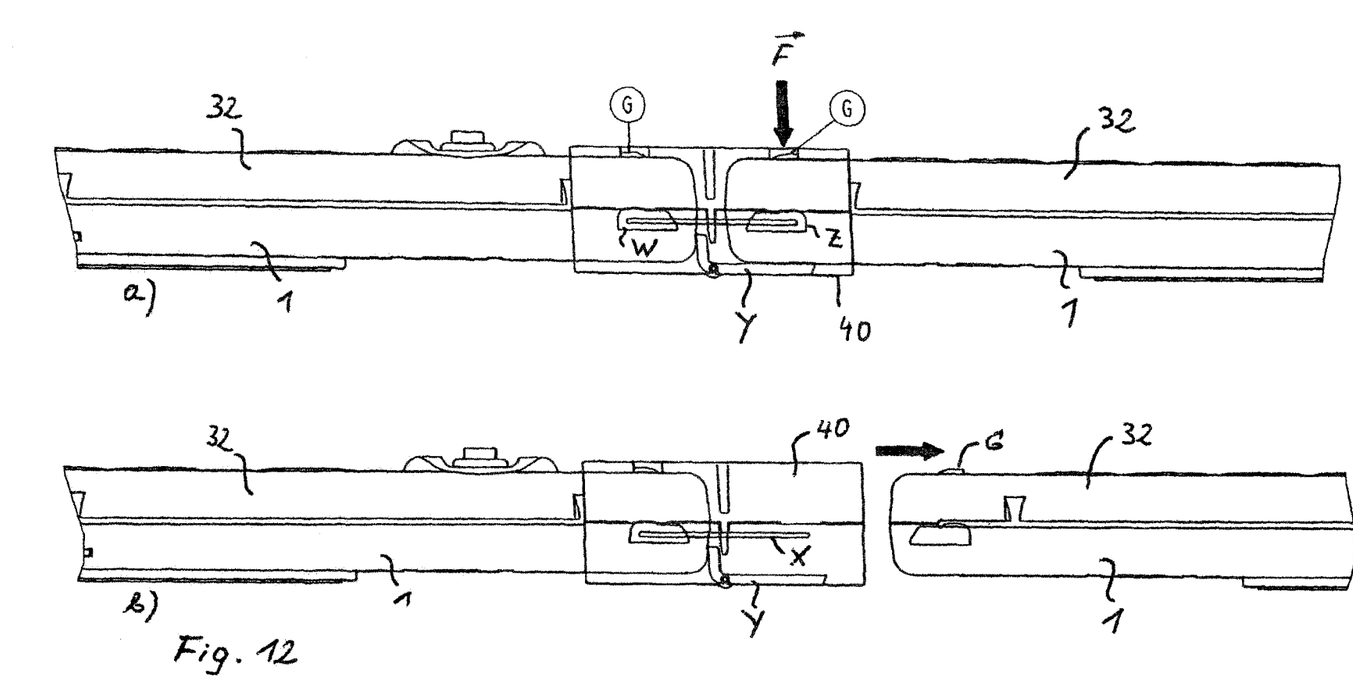
FIGS. 12*a* and 12*b* show a sequence of the separation of two mated or coupled switchgear cabinet luminaires.

FIGS. 12a and 12b show how the separation of the two switchgear cabinet luminaires can be realised.

In this respect, the action of a pressure force F on the detent lug G occurs according to the illustrated arrow in FIG. 12a in such a way that it is capable of moving out of a latching recess in the hollow body 40. As is shown in FIG. 12b, the right switchgear cabinet luminaire can then be removed from the connection element.

The invention claimed is:

1. A switchgear cabinet luminaire, comprising illuminants on the basis of light-emitting diodes (31), consisting of an elongated luminaire housing having a housing main body (1) and a translucent cover (32) as well as electrical connection elements and means for fixing provided on the luminaire housing, characterized in that the housing main body (1) is formed in the manner of a trough, and several spaced recesses or set-back portions (2) are provided for the releasable accommodation of a pivot bearing support (3) on its bottom side and/or in the side wall region, the pivot bearing support (3) comprises two side surfaces (4) which are connected via a web (5), wherein the side surfaces (4) each comprise a receptacle (6) for a pivot shaft (7) or a respective pivot shaft stub, arms (8) are further formed which originate from the web (5), which arms are oriented towards the bottom side or the side wall region of the housing main body (1) and each converge at their free end into a detent lug or a latching hook (9) for engagement in the respective recesses or set-back portions (2), the side surfaces (4) of the pivot bearing support (3) comprise a yieldingly resilient stop edge (10) which can be brought into contact with the bottom side of the housing main body (1), wherein, in the region facing away from the stop edge (10), several latches (12) for locking the pivot angle are provided in the manner of a circular arc in the side surfaces, which latches originate radially from the receptacle (6) for the pivot shaft (7) or the pivot shaft stub (12), characterized in that the bottom side of the housing main body (1) comprises respectively opposite set-back portions (200) for accommodating the latching hooks or detent lugs (9), and further comprises grooves (210) which are oriented at a right angle to the longitudinal axis of the luminaire housing, wherein the stop edges (10) of the pivot bearing support (3) dip into the respective grooves (210).

2. A connection element for coupling switchgear cabinet luminaires, the switchgear cabinet luminaires comprising illuminants on the basis of light-emitting diodes (31), consisting of an elongated luminaire housing having a housing main body (1) and a translucent cover (32) as well as electrical connection elements and means for fixing provided on the luminaire housing, characterized in that the housing main body (1) is formed in the manner of a trough, and several spaced recesses or set-back portions (2) are provided for the releasable accommodation of a pivot bearing support (3) on its bottom side and/or in the side wall region, the pivot bearing support (3) comprises two side surfaces (4) which are connected via a web (5), wherein the side surfaces (4) each comprise a receptacle (6) for a pivot shaft (7) or a respective pivot shaft stub, arms (8) are further formed which originate from the web (5), which arms are oriented towards the bottom side or the side wall region of the housing main body (1) and each converge at their free end into a detent lug or a latching hook (9) for engagement in the respective recesses or set-back portions (2), the side surfaces (4) of the pivot bearing support (3) comprise a yieldingly resilient stop edge (10) which can be brought into contact with the bottom side of the housing main body (1), wherein, in the region facing away from the stop edge (10), several latches (12) for locking the pivot angle are provided in the manner of a circular arc in the side surfaces, which latches originate radially from the receptacle (6) for the pivot shaft (7) or the pivot shaft stub (12), characterized in that the connection element consists of a hollow body (40) which is open on both sides, wherein the opposite open sides of the hollow body (40) have a cross-sectional surface which is complementary to the cross-sectional shape of the luminaire housing, such that the respective ends of the luminaire housing can be inserted into the hollow body (40) and can be locked there, wherein electrical connectors (X) are arranged in the interior of the hollow body, which connectors correspond to connectors (W; Z) in the luminaire housing, further comprising a pivotably movable pawl (Y) with a limit stop (Y1) and a blocking web (Y2), wherein the blocking web (Y2) prevents an insertion of a live switchgear cabinet luminaire until a further switchgear cabinet luminaire to be coupled is inserted into the opposite open side of the hollow body (40).

3. A connection element according to claim 2, characterized in that after the completed insertion of the voltage-free switchgear cabinet luminaire the luminaire housing of said luminaire comes into contact with the limit stop (Y1) of the pawl (Y), with the consequence of moving the blocking web (Y2) from its blocking position to a release position.

* * * * *